W. W. BLAIR.
VEHICLE SPRING.
APPLICATION FILED NOV. 18, 1907.

905,981.

Patented Dec. 8, 1908.

Witnesses:
Nathan C. Lombard
Edna C. Cleveland

Inventor:
Wesley W. Blair,
by Walter C. Lombard,
Atty.

THE NORRIS PETERS CO., WASHINGTON, D. C.

UNITED STATES PATENT OFFICE.

WESLEY W. BLAIR, OF NEWTONVILLE, MASSACHUSETTS.

VEHICLE-SPRING.

No. 905,981.  Specification of Letters Patent.  Patented Dec. 8, 1908.

Application filed November 18, 1907. Serial No. 402,729.

*To all whom it may concern:*

Be it known that I, WESLEY W. BLAIR, a citizen of the United States of America, and a resident of Newtonville, in the county of Middlesex and State of Massachusetts, have invented certain new and useful Improvements in Vehicle-Springs, of which the following is a specification.

This invention relates to springs and particularly to that class of springs which are adapted for use on motor vehicles and other carriages.

It has for its object the production of a spring which will be simple in construction and have great resiliency, the amount of which may be regulated as desired.

The invention consists in certain novel features of construction and arrangement of parts which will be readily understood by reference to the description of the drawings and to the claim hereinafter given.

Figure 1:
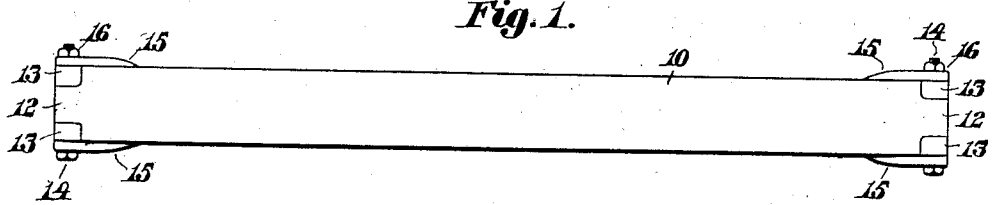
Figure 2:
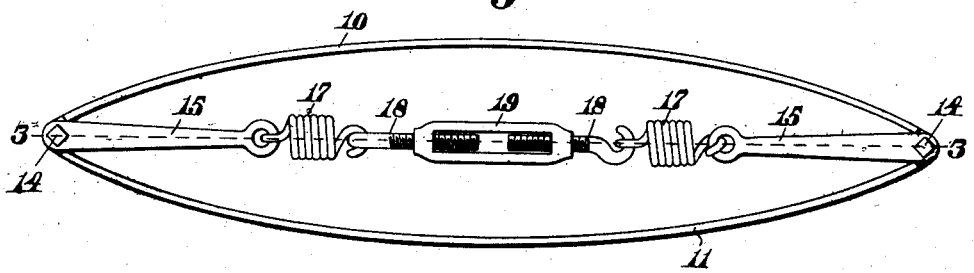
Figure 3:
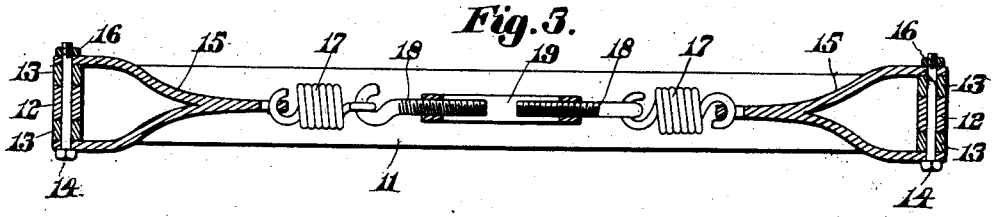

Of the drawings: Figure 1 represents a plan view of a spring embodying the features of this invention. Fig. 2 represents a side elevation of the same, and Fig. 3 represents a horizontal section of the same, the cutting plane being on line 3—3 on Fig. 2.

Similar characters designate like parts throughout the several figures of the drawing.

In the drawings, 10 and 11 represent two flat springs the ends of which are provided respectively with the bosses 12 and 13. Each set of co-acting bosses 12 and 13 has extending through openings in said bosses, a pivot pin 14 which has also mounted thereon a bifurcated member 15. The pivot pin or bolt 14 is threaded at one end and has mounted thereon a suitable nut 16 to retain the pivot pin 14 in position. Secured to the inner end of each bifurcated member 15 is a coiled spring 17 the opposite end of which has attached thereto the threaded member 18, each threaded member 18 extending through the threaded ends of a suitable turnbuckle 19.

The tension of the coiled springs 17 is such as to normally retain the pivots 14 at such distance from each other as to keep the flat springs 10 and 11 bowed, as shown in Fig. 2. It is self evident, however, that under abnormal conditions when a sudden strain is brought upon the flat springs 10 and 11, thus causing them to straighten and separate the pivot pins 14, the coiled springs 17 will yield and allow such separation, returning the pivots to their normal position as soon as the abnormal strain has ceased. The ends of the members 18 are provided with right and lefthand threads which are threaded to the turnbuckle 19 so that when the turnbuckle 19 is moved in either direction the distance between the two pivot pins 14 may be increased or decreased as desired, thus regulating the tension of the springs 17.

While in the drawings a single set of connecting members 17, 18, and 19 are indicated and these are interposed between the flat springs 10 and 11, it is obvious that if so desired these members may be duplicated and separated in such manner as to be out of the plane of movement of the springs 10 and 11 when strain is brought thereon to straighten the same.

While the construction shown in the drawings is a most convenient one to accomplish the object sought it is quite obvious that the details of construction of these parts may be varied without altering the principles of the invention, which consists primarily in providing a yieldable means between the pivots by which the flat springs are connected together at their ends and also providing a means for varying the distance between these pivots in order to regulate the resiliency of the springs 10 and 11.

It is believed that from the foregoing the operation of the invention and the many advantages of a spring constructed in the manner herein set forth will be fully apparent without any further description.

Having thus described my invention, I claim:

In a device of the class described, the combination of two flat springs pivotally secured together at their ends; a member secured to each pivot; a spring secured to each member; a threaded member attached to each spring; and a turnbuckle on and connecting said threaded members.

Signed by me at Boston, Mass., this 14th day of November, 1907.

WESLEY W. BLAIR.

Witnesses:
 EDNA C. CLEVELAND,
 WALTER E. LOMBARD.